United States Patent
Lee et al.

(10) Patent No.: US 10,821,405 B2
(45) Date of Patent: Nov. 3, 2020

(54) SYSTEM FOR EVALUATING PERFORMANCE OF CARBON DIOXIDE SEPARATION MEMBRANE MODULE AND DEVICE THEREFOR

(71) Applicants: KOREA ELECTRIC POWER CORPORATION, Naju-si (KR); ARSTROMA CO., LTD., Daegu (KR); KOREA EAST-WEST POWER CO., LTD., Ulsan (KR); KOREA SOUTH-EAST POWER CO., LTD., Jinju-si (KR); KOREA WESTERN POWER CO., LTD., Taean-gun (KR)

(72) Inventors: Jung Bin Lee, Daejeon (KR); Joong Won Lee, Daejeon (KR); Kyung Min Kim, Seongnam-si (KR); Jun Han Kim, Daejeon (KR); Yong Seok Eom, Daejeon (KR); Ky Yeong Shin, Daegu (KR); Gwan Shig Kim, Pohang-si (KR)

(73) Assignees: KOREA ELASTIC POWER CORPORATION, Naju-si (KR); ARSTROMA CO., LTD., Daegu (KR); KOREA EAST-WEST POWER CO., LTD., Ulsan (KR); KOREA SOUTH-EAST POWER CO., LTD., Jinju-si (KR); KOREA WESTERN POWER CO., LTD., Taean-gun (KR)

( * ) Notice: Subject to any disclaimer, the term of this patent is extended or adjusted under 35 U.S.C. 154(b) by 115 days.

(21) Appl. No.: 16/316,463

(22) PCT Filed: Jan. 5, 2018

(86) PCT No.: PCT/KR2018/000257
§ 371 (c)(1),
(2) Date: Jan. 9, 2019

(87) PCT Pub. No.: WO2019/022321
PCT Pub. Date: Jan. 31, 2019

(65) Prior Publication Data
US 2020/0179879 A1    Jun. 11, 2020

(51) Int. Cl.
*B01D 65/10*    (2006.01)
*G01N 15/08*    (2006.01)
*B01D 71/02*    (2006.01)

(52) U.S. Cl.
CPC .............. *B01D 65/10* (2013.01); *G01N 15/08* (2013.01); *B01D 71/021* (2013.01); *B01D 71/024* (2013.01)

(58) Field of Classification Search
CPC ................................ G01N 15/08; B01D 65/10
See application file for complete search history.

(56) References Cited

U.S. PATENT DOCUMENTS

2018/0272272 A1* 9/2018 Hasegawa ............... C10L 3/105
2019/0366264 A1* 12/2019 Kim ..................... B01D 53/225
2020/0001229 A1* 1/2020 Shimizu ................. B01D 71/02

FOREIGN PATENT DOCUMENTS

CN    102580547 B  *  5/2014
JP    2000-102717 A     4/2000
(Continued)

OTHER PUBLICATIONS

IP.com English translation of CN 102580547 B (Year: 2014).*
IP.com English translation of WO 2016/122067 (Year: 2016).*

*Primary Examiner* — John Fitzgerald
(74) *Attorney, Agent, or Firm* — Foundation Law Group, LLP

(57) ABSTRACT

A carbon dioxide ($CO_2$) separation membrane module performance evaluation system and device may include a simulated gas supply line configured to simulate a gas composition of boiler exhaust gas and supply the gas to a module unit part; the module unit part including a $CO_2$
(Continued)

separation membrane module and configured to cause the gas to permeate through the $CO_2$ separation membrane module and separately discharge permeated gas, to a permeation line, and separately discharge passed gas to a passage line; a discharge line configured to combine the gases and discharge the combined gas to the outside of the system; an analyzer part configured to collect each of the gas, analyze components thereof, and evaluate performance of the module; a refiner part to remove pollutants; a measurer part to measure a flow rate, a temperature, and a pressure; and a controller part to determine a state of the overall system.

13 Claims, 2 Drawing Sheets

(56) References Cited

FOREIGN PATENT DOCUMENTS

| | | | |
|---|---|---|---|
| JP | 2003-053162 A | | 2/2003 |
| JP | 2016-190212 A | | 11/2016 |
| KR | 10-2008-0038541 A | | 5/2008 |
| KR | 10-1537353 B1 | | 7/2015 |
| WO | WO 2016/122067 | * | 4/2016 |

* cited by examiner

【FIG. 1】
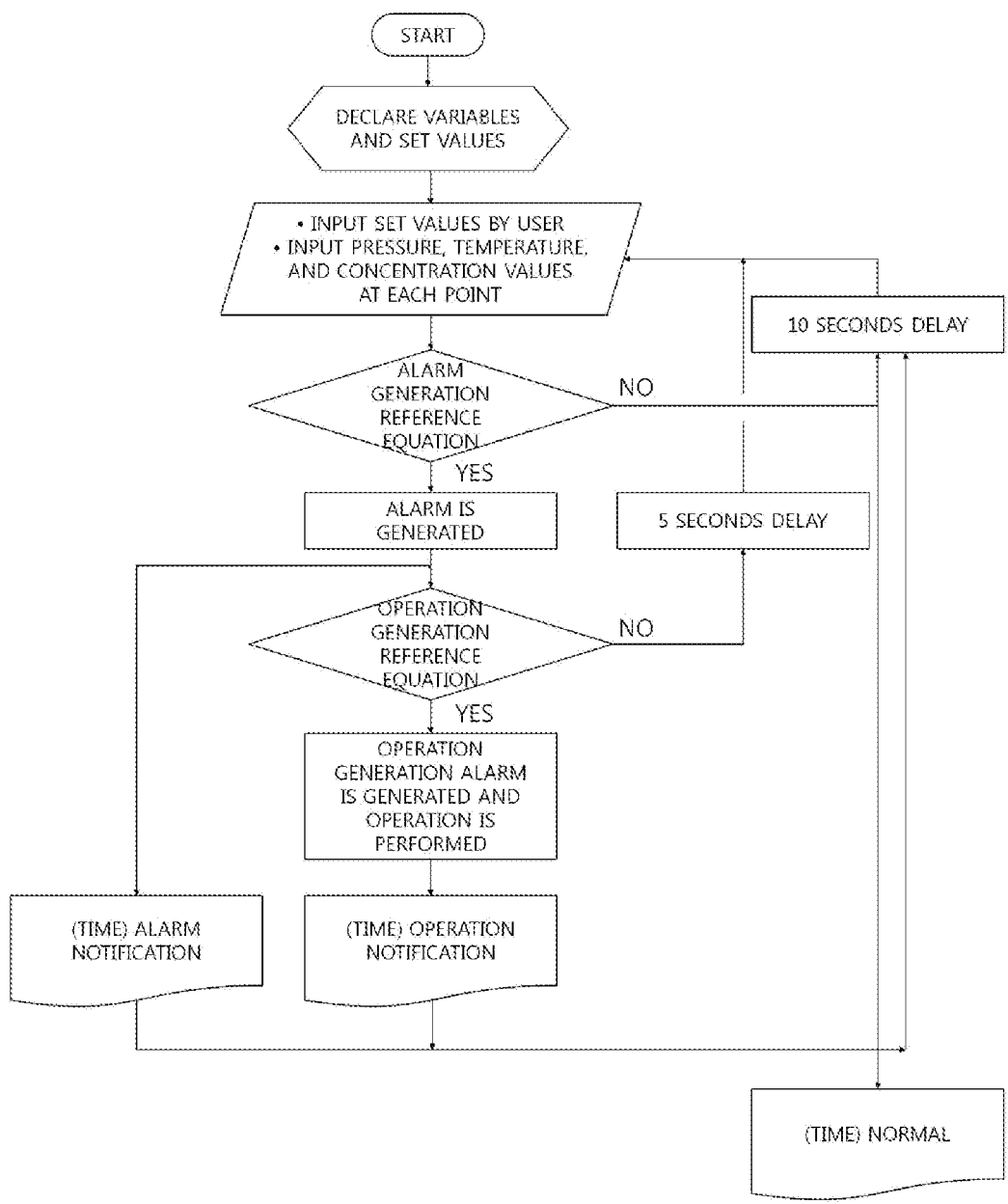

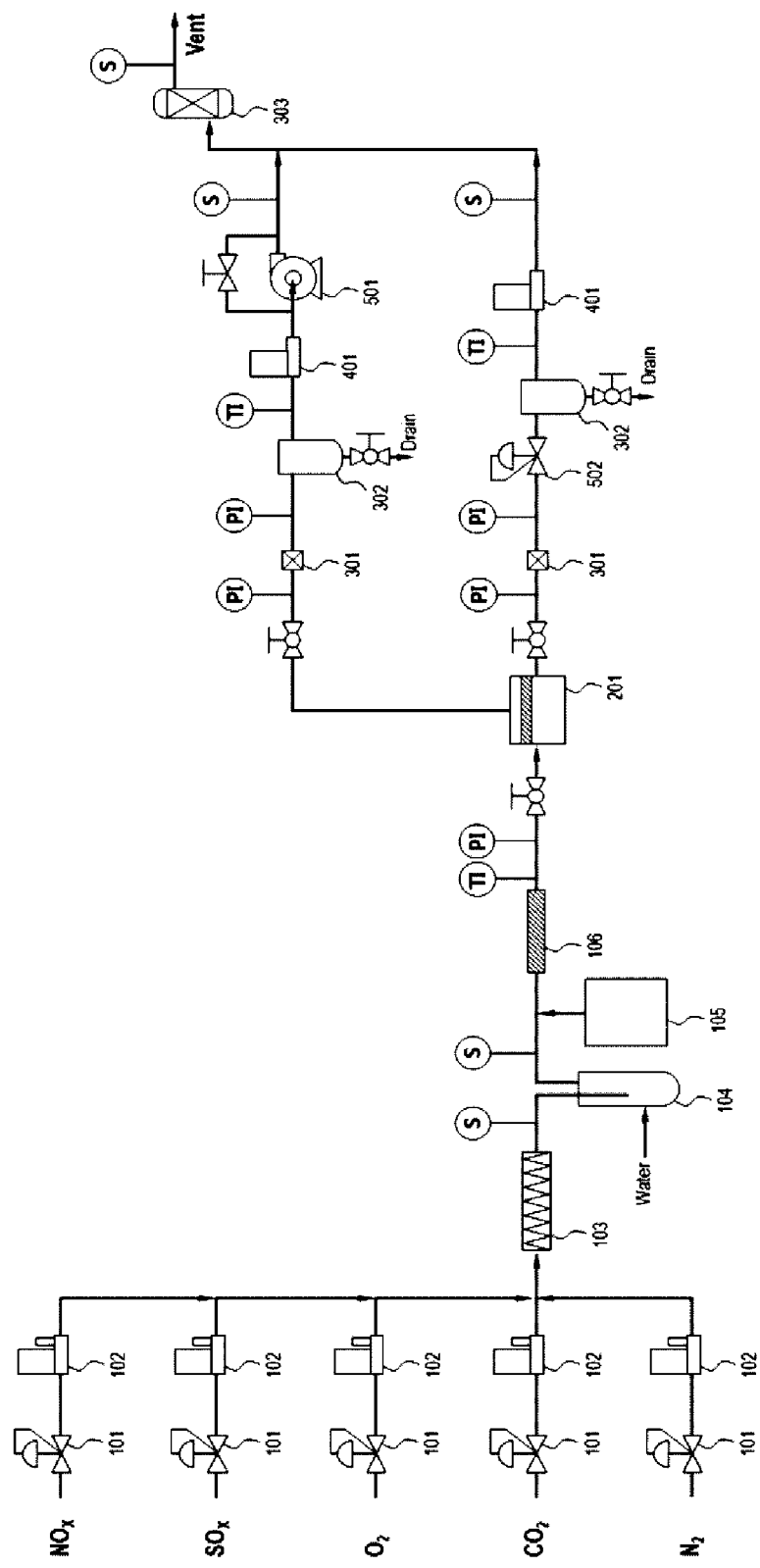
[FIG. 2]

SYSTEM FOR EVALUATING PERFORMANCE OF CARBON DIOXIDE SEPARATION MEMBRANE MODULE AND DEVICE THEREFOR

CROSS REFERENCE TO RELATED PATENT APPLICATION

This application claims the benefit under 35 U.S.C. Section 371, of PCT International Application No. PCT/KR2018/000257, filed on Jan. 5, 2018, which claimed priority to Korean Patent Application No. KR 10-2017-0096183, filed on Jul. 28, 2017, the disclosures of which are hereby incorporated by the references.

TECHNICAL FIELD

The present invention relates to a carbon dioxide ($CO_2$) separation membrane module performance evaluation system and device therefor.

BACKGROUND ART

Efforts are being made worldwide to reduce carbon dioxide ($CO_2$) emissions to reduce the rapid climate change caused by global warming. Accordingly, there is a growing demand for carbon capture and sequestration (CCS) technology that can capture $CO_2$ from exhaust gas generated by burning fossil fuels.

Conventional CCS technologies include an absorption technique in which exhaust gas is brought into contact with a chemical $CO_2$ absorbent such as amine, ammonia, or potassium carbonate, an adsorption technique, such as pressure swing adsorption (PSA) and temperature swing adsorption (TSA) in which exhaust gas is caused to pass through an adsorbent using a difference in temperature or pressure, and a cryogenic technique in which target gas is selectively cooled and condensed using a difference in vapor pressure according to the gas species. However, such the conventional CCS technologies have high energy consumption and have clear limitations in terms of the processing capacity or facility maintenance.

One of the newly developed CCS technologies is the $CO_2$ separation membrane system, which is capable of separating $CO_2$ from exhaust gas generated from coal-fired power plants at low cost and high efficiency. The $CO_2$ separation membrane separates and captures $CO_2$ from the exhaust gas using a difference in size of gas molecules contained in the exhaust gas and a difference in permeation rate.

Generally, the $CO_2$ separation membrane system uses a module unit part which combines a separation membrane material with a support body or the like in an internal pressure vessel, causes injected gas to pass therethrough, captures $CO_2$, and then discharges $CO_2$ and the filtered gas. The $CO_2$ separation membrane system may expand facility and processing capacity in a relatively easy way by increasing the number of separation membranes or modules according to operation conditions and separation performance goals.

In addition, the $CO_2$ separation membrane system has advantages in that it is highly efficient in terms of energy because it does not involve phase change in the $CO_2$ separation process, it is environmentally friendly because it does not emit harmful substances in the air and does not discharge wastewater, it is relatively easy to install a device and facility therefor because it is in the form of a module, and it is possible to expand its application, beyond the $CO_2$ capture process, to other gas capture technical fields such as the gas refining field.

However, since the $CO_2$ separation membrane system is a relatively recently introduced technology, there are not many cases of application and commercialization of the $CO_2$ separation membrane system in actual power plants. Accordingly, there is a great need for continuous research and technology development for the $CO_2$ separation membrane system.

As an example, for commercialization of the $CO_2$ separation membrane system, a plurality of modules and a design process for a multi-stage separation membrane process should be premised. To this end, it is essential to obtain experimental data by evaluating the performance of a $CO_2$ separation membrane module. Also, to improve the accuracy of evaluating the performance of the separation membrane module, it is necessary to evaluate the influence of impurities such as moisture, dust, sulfur oxides, and nitrogen oxides contained in the exhaust gas as in the actual operating environment. However, impurities in the exhaust gas generated during the performance evaluation process may cause deterioration of the separation membrane of the evaluation device, and thus safety of an experimenter may be impaired.

Therefore, there is a growing demand for a system, which is capable of implementing performance evaluation conditions very similar to the actual operating environment, has high accuracy and efficiency of performance evaluation, and is capable of safely evaluating the performance of a $CO_2$ separation membrane module without causing an accident due to any risk factor, and a performance evaluation device capable of achieving the same.

DISCLOSURE

Technical Problem

One aspect of the present invention provides a carbon dioxide ($CO_2$) separation membrane module performance evaluation system and $CO_2$ separation membrane module performance evaluation device capable of implementing performance evaluation conditions very similar to the actual operating environment and performing evaluation of efficiency of $CO_2$ separation and evaluation of influence of impurities in exhaust gas on the separation membrane module.

Another aspect of the present invention provides a $CO_2$ separation membrane module performance evaluation system and device therefor which is environmentally friendly because impurities are removed from exhaust gas after the performance evaluation and which is capable of preventing deterioration of the separation membrane and damages to the module.

Technical Solution

An embodiment of the present invention relates to a carbon dioxide ($CO_2$) separation membrane module performance evaluation system including: a simulated gas supply line configured to simulate a gas composition of boiler exhaust gas and supply the simulated gas to a module unit part; the module unit part including a $CO_2$ separation membrane module and configured to cause the simulated gas to permeate through the $CO_2$ separation membrane module and separately discharge permeated gas, which has permeated through the separation membrane, to a permeation line, and separately discharge passed gas, which has failed to permeate through the separation membrane, to a passage line; a discharge line configured to combine the gases discharged from the permeation line and the passage line and discharge the combined gas to the outside of the system; an analyzer part configured to collect each of the gas supplied from the supply line to the module unit part, the permeated gas discharged from the module unit part, and the passed gas discharged from the module unit part, analyze components thereof, and evaluate performance of the module; a refiner part installed in each of the permeation line, the passage line, and the discharge line and configured to remove pollutants from the gases passing through each of the lines; a measurer part configured to measure a flow rate, a temperature, and a pressure using a measuring instrument installed in each of the gas supply line, the permeation line, the passage line, and the discharge line; and a controller part configured to determine a state of the overall system on the basis of pieces of information collected from the analyzer part and the measurer part and generate an operation corresponding to a determined result.

Another embodiment of the present invention relates to a carbon dioxide ($CO_2$) separation membrane module performance evaluation device including: a simulated gas supply line configured to simulate a gas composition of boiler exhaust gas and supply the simulated gas to a module unit part; the module unit part including a $CO_2$ separation membrane module and configured to cause the simulated gas to permeate through the $CO_2$ separation membrane module and separately discharge permeated gas, which has permeated through the separation membrane, to a permeation line, and separately discharge passed gas, which has failed to permeate through the separation membrane, to a passage line; a discharge line which includes a line mixer configured to combine the gases discharged from the permeation line and the passage line and which is configured to discharge the combined gas to the outside of the system; an analyzer part configured to collect each of the gas supplied from the supply line to the module unit part, the permeated gas discharged from the module unit part, and the passed gas discharged from the module unit part, analyze components thereof, and evaluate performance of the module; a refiner part installed in each of the permeation line, the passage line, and the discharge line and configured to remove pollutants from the gases passing through each of the lines; a measurer part configured to measure a flow rate, a temperature, and a pressure using a flow indicator, a temperature indicator, and a pressure indicator installed in each of the gas supply line, the permeation line, the passage line, and the discharge line; and a controller part configured to determine a state of the overall system on the basis of pieces of information collected from the analyzer part and the measurer part and generate an operation corresponding to a determined result.

Advantageous Effects

The present invention can provide a carbon dioxide ($CO_2$) separation membrane module performance evaluation system and device therefor, which is capable of implementing performance evaluation conditions very similar to the actual operating environment, has high accuracy and efficiency of performance evaluation, is capable of removing impurities in exhaust gas, is capable of improving safety of an experimenter by preventing deterioration of the separation membrane due to impurities, and is capable of safely evaluating the performance of a $CO_2$ separation membrane module without causing an accident due to any risk factor.

DESCRIPTION OF DRAWINGS

FIG. 1 illustrates a flowchart of performance evaluation of a carbon dioxide ($CO_2$) separation membrane module according to an embodiment of the present invention.

FIG. 2 illustrates a $CO_2$ separation membrane module performance evaluation device according to an embodiment of the present invention.

MODES OF THE INVENTION

An embodiment of the present invention relates to a carbon dioxide ($CO_2$) separation membrane module performance evaluation system including: a simulated gas supply line configured to simulate a gas composition of boiler exhaust gas and supply the simulated gas to a module unit part; the module unit part including a $CO_2$ separation membrane module and configured to cause the simulated gas to permeate through the $CO_2$ separation membrane module and separately discharge permeated gas, which has permeated through the separation membrane, to a permeation line, and separately discharge passed gas, which has failed to permeate through the separation membrane, to a passage line; a discharge line configured to combine the gases discharged from the permeation line and the passage line and discharge the combined gas to the outside of the system; an analyzer part configured to collect each of the gas supplied from the supply line to the module unit part, the permeated gas discharged from the module unit part, and the passed gas discharged from the module unit part, analyze components thereof, and evaluate performance of the module; a refiner part installed in each of the permeation line, the passage line, and the discharge line and configured to remove pollutants from the gases passing through each of the lines; a measurer part configured to measure a flow rate, a temperature, and a pressure using a measuring instrument installed in each of the gas supply line, the permeation line, the passage line, and the discharge line; and a controller part configured to determine a state of the overall system on the basis of pieces of information collected from the analyzer part and the measurer part and generate an operation corresponding to a determined result.

In this way, the present invention may provide a $CO_2$ separation membrane module performance evaluation system which is capable of implementing performance evaluation conditions very similar to the actual operating environment, has high accuracy and efficiency of performance evaluation, is capable of removing impurities in exhaust gas, is capable of improving safety of an experimenter by preventing deterioration of the separation membrane due to the impurities, and is capable of safely evaluating the performance of a $CO_2$ separation membrane module without causing an accident due to any risk factor.

The simulated gas supply line (hereinafter, supply line) may include a gas supplier part configured to supply one or more gases among $CO_2$, nitrogen, oxygen, sulfur oxides ($SO_x$) and nitrogen oxides ($NO_x$) to the supply line and an impurities supplier part configured to supply one or more atmospheric impurities among moisture and dust to the supply line. In this way, the $CO_2$ separation membrane module performance evaluation system may create performance evaluation conditions very similar to exhaust gas generated in the actual operating environment by causing the simulated gas to contain not only $CO_2$, nitrogen, and oxygen which are contained in the atmosphere but also sulfur oxides ($SO_x$), nitrogen oxides ($NO_x$), moisture, dust, and the like which are pollutants.

The module unit part includes the $CO_2$ separation membrane module, which is subject to performance evaluation, and causes the simulated gas, which is supplied from the supply line, to permeate through the $CO_2$ separation membrane module and separately discharges the permeated gas, which has permeated through the separation membrane, to the permeation line, and the passed gas, which has failed to permeate through the separation membrane, to the passage line.

In addition, the gases discharged from the permeation line and the passage line may be finally discharged to the outside of the system via the discharge line. In this case, the gases discharged from the permeation line, the passage line, and the discharge line are discharged to the outside of the system after impurities are removed therefrom through the refiner part, thereby improving the environmental friendliness of the system.

The refiner part may remove pollutants from the gases discharged from the $CO_2$ separation membrane module by using one or more of a dust filter, a cooler, a $SO_x$ and $NO_x$ removal column disposed in each of the permeation line, the passage line, and the discharge line. In this way, the $CO_2$ separation membrane module performance evaluation system may remove impurities from the discharged gases at high efficiency after the performance evaluation.

The analyzer part may collect each of the gas supplied from the supply line to the module unit part, the permeated gas discharged from the module unit part, and the passed gas discharged from the module unit part, analyze components thereof, evaluate performance of the module, and transmit analysis values to the controller part. Also, the collecting method is not particularly limited, but one or more or two or more sample ports may be installed in each of the supply line, the permeation line, the passage line, and the discharge line to collect gas samples to be analyzed. In such a case, the sample ports may be installed at a front end and a rear end of each line or at a front end and a rear end of a facility installed in each line. For example, a supplier facility such as a moisture supply unit may be further included in the supply line, and in such a case, sample ports may be installed at a front end and a rear end of the moisture supply unit in the supply line to perform analysis.

The measurer part may measure a flow rate, a temperature, and a pressure using a measuring instrument installed in each of the supply line, the permeation line, the passage line, and the discharge line and transmit the measured values to the controller part. Also, the measuring method is not particularly limited, but one or more or two or more measuring instruments may be installed in each of the supply line, the permeation line, the passage line, and the discharge line to collect pieces of information on the flow rate, temperature, and pressure. In such a case, the measuring instruments may be installed at a front end and rear end of each line or at a front end and a rear end of a facility installed in each line. For example, a refiner part facility such as a dust filter may be further included in the permeation line, and in such a case, measuring instruments may be installed at a front end and a rear end of the dust filter to perform analysis.

When the collected pieces of information satisfy one or more of the following Equations 1 to 3, the controller part that has received the pieces of information collected from the analyzer part and/or the measurer part may perform an operation generating an alarm indicating that a pressure is abnormal. In this way, the $CO_2$ separation membrane module performance evaluation system may determine whether the process of removing pollutants is necessary, detect an abnormality in system operation conditions, and determine whether it is necessary to change the operation conditions.

$$PRI-PPI \leq SET\_DPPR \qquad \text{[Equation 1]}$$

$$PF \geq 0.9 \times SET\_PM \qquad \text{[Equation 2]}$$

$$PF-PRI \geq 0.9 \times SET\_DPM \qquad \text{[Equation 3]}$$

In Equations 1 to 3, PF represents a pressure of the supply line in a front end of the module unit part, PPI represents a pressure of the permeation line in a front end of the refiner part, PRI represents a pressure of the passage line in a front end of the refiner part; SET_DPPR represents an allowable pressure difference value between the passage line and the permeation line, SET_PM represents an allowable pressure value of the supply line, and SET_DPM represents an allowable pressure difference value between the supply line and the passage line.

Specifically, the PF refers to a measured value of a pressure injected into the module unit, PPI refers to a measured value of a pressure discharged from the module unit to the permeation line, and PM refers to a measured value of a pressure discharged from the module unit to the passage line. Also, SET_DPPR refers to an allowable pressure difference value between the passage line and the permeation line set by the user according to system operation goals, SET_PM refers to an allowable pressure value of the supply line set by the user according to system operation goals, and SET_DPM refers to an allowable pressure difference value between the supply line and the passage line set by the user according to system operation goals. The set values are not particularly limited and may be changed according to system operation goals, system states, and characteristics of the separation membrane module subject to evaluation.

In addition, the controller part may perform an operation changing the system operation conditions when the pieces of collected information satisfy one or more of the following Equations 4 to 6. Also, the controller part may generate an additional alarm to indicate a time to perform a countermeasure. In this way, the $CO_2$ separation membrane module performance evaluation system may determine whether the process of removing pollutants is necessary and prevent damages to the separation membrane module which is subject to evaluation.

$$PRI-PPI < 0 \qquad \text{[Equation 4]}$$

$$PF \geq SET\_PM \qquad \text{[Equation 5]}$$

$$PF-PRI \geq SET\_DPM \qquad \text{[Equation 6]}$$

In Equations 4 to 6, PF, PPI, PRI, SET_PM, and SET_DPM are the same as described above.

In a specific example, when the collected information satisfies Equation 4, the controller part may change system operation conditions so that an operation increasing an amount of gas discharged from the permeation line is performed. In such a case, an abnormality alarm generated due to satisfying Equation 4 may be released, and an abnormal operation state of the system may be released.

In another specific example, when the collected information satisfies Equation 5, the controller part may change system operation conditions so that an operation increasing an amount of gas discharged from the passage line, an operation lowering a flow rate of gas supplied from the supply line or blocking the flow of the gas, an operation blocking the operation of the refiner part, or the like is performed. In such a case, an abnormality alarm generated due to satisfying Equation 5 may be released, and an abnormal operation state of the system may be released.

In still another specific example, when the collected information satisfies Equation 6, the controller part may change system operation conditions so that an operation lowering a flow rate of gas supplied from the supply line or blocking the flow of the gas, an operation blocking the operation of the refiner part, or the like is performed. In such a case, an abnormality alarm generated due to satisfying Equation 6 may be released, and an abnormal operation state of the system may be released.

When the collected information satisfies one or more of the following Equations 7 and 8, the controller part may perform an operation generating an alarm indicating that a temperature is abnormal. In this way, the $CO_2$ separation membrane module performance evaluation system may determine whether the process of removing pollutants is necessary, detect an abnormality in system operation conditions, and determine whether it is necessary to change the operation conditions.

$$TP \geq 0.9 \times SET\_MFM \quad \text{[Equation 7]}$$

$$TR \geq 0.9 \times SET\_MFM \quad \text{[Equation 8]}$$

In Equations 7 and 8, TP represents a temperature measured in the permeation line, TR represents a temperature measured in the passage line, and SET_MFM represents an allowable system temperature.

Specifically, SET_MFM refers to a system temperature value set by the user according to system operation goals. Such a set value is not particularly limited and may be changed according to system operation goals, system states, and characteristics of the separation membrane module subject to evaluation.

When the collected information satisfies one or more of the following Equations 9 and 10, the controller part may perform an operation changing the system operation conditions. Also, the controller part may generate an additional alarm to indicate a time to perform a countermeasure. In this way, the $CO_2$ separation membrane module performance evaluation system may determine whether the process of removing pollutants is necessary and prevent deterioration of the separation membrane and damages to the separation membrane module.

$$TP \geq SET\_MFM \quad \text{[Equation 9]}$$

$$TR \geq SET\_MFM \quad \text{[Equation 10]}$$

In Equations 9 and 10, TP, TR, and SET_MFM are the same as described above.

In a specific example, when the collected information satisfies any one of Equations 9 and 10, the controller part may change system operation conditions so that an operation lowering a temperature of gas passing through the permeation line or the passage line is performed. In such a case, an abnormality alarm generated due to satisfying Equation 9 or 10 may be released, and an abnormal operation state of the system may be released.

When the collected information satisfies one or more of the following Equations 11 to 14, the controller part may perform an operation generating an alarm indicating that the refiner part is abnormal. In this way, the $CO_2$ separation membrane module performance evaluation system may determine whether the process of removing pollutants is necessary, detect an abnormality in system operation conditions, and determine whether it is necessary to change the operation conditions.

$$C\_SOX \geq 0.9 \times SET\_CSOX \quad \text{[Equation 11]}$$

$$C\_NOX \geq 0.9 \times SET\_CNOX \quad \text{[Equation 12]}$$

$$PPI-PPO \geq 0.9 \times SET\_DPF \quad \text{[Equation 13]}$$

$$PRI-PRO \geq 0.9 \times SET\_DPF \quad \text{[Equation 14]}$$

In Equations 11 to 14, PPI represents a pressure of the permeation line in a front end of the refiner part, PPO represents a pressure of the permeation line in a rear end of the refiner part, PRI represents a pressure of the passage line in a front end of the refiner part, PRO represents a pressure of the passage line in a rear end of the refiner part, C_SOX represents a $SO_x$ concentration measured in the discharge line, C_NOX represents a $NO_x$ concentration measured in the discharge line, SET_CSOX represents an allowable $SO_x$ discharge value, SET_CNOX represents an allowable $NO_x$ discharge value, and SET_DPF represents an allowable pressure difference value of the refiner parts.

Specifically, the PPI, PPO, PRI, PRO, C_SOX, and C_NOX are measured values, and the SET_CSOX and SET_DPF are set values set by the user according to system operation goals. The set values may be changed according to system operation goals, system states, and characteristics of the separation membrane module subject to evaluation.

When the collected information satisfies one or more of the following Equations 15 to 18, the controller part may perform an operation changing system operation conditions. Also, the controller part may generate an additional alarm to indicate a time to perform a countermeasure. In this way, the $CO_2$ separation membrane module performance evaluation system may determine whether the process of removing pollutants is necessary, control an extent to which pollutants are removed from exhaust gas being discharged, and prevent damages to the separation membrane module.

$$C\_SOX \geq SET\_CSOX \quad \text{[Equation 15]}$$

$$C\_NOX \geq SET\_CNOX \quad \text{[Equation 16]}$$

$$PPI-PPO \geq SET\_DPF \quad \text{[Equation 17]}$$

$$PRI-PRO \geq SET\_DPF \quad \text{[Equation 18]}$$

In Equations 15 to 18, PPI, PPO, PM, PRO, C_SOX, C_NOX, SET_CSOX, SET_CNOX, and SET_DPF are the same as described above.

In a specific example, when the collected information satisfies any one of the Equations 15 and 16, the controller part may change system operation conditions so that an operation decreasing an amount of discharged gas injected into the discharge line or an operation increasing an amount of $SO_x$ and/or $NO_x$ removed from the refiner part is performed. In such a case, an abnormality alarm generated due to satisfying Equation 15 or 16 may be released, and an abnormal operation state of the system may be released.

In another specific example, when the collected information satisfies any one of the Equations 17 and 18, the controller part may change system operation conditions so that an operation lowering a flow rate of gas supplied from the supply line or blocking the flow of the gas, an operation blocking the operation of the refiner part, or the like is performed. In such a case, an abnormality alarm generated due to satisfying Equations 17 or 18 may be released, and an abnormal operation state of the system may be released.

FIG. 1 illustrates a flowchart of the controller part in the $CO_2$ separation membrane module performance evaluation system according to the present invention. Referring to FIG. 1, values determined to be suitable by the user in relation to the allowable values (set values) among the variables of Equations 1 to 18 may be set by being input to the controller part during operation of the system. Also, the analyzer part and the measurer part of the system collect analysis values of components and compositions (concentrations) of the collected samples and the pieces of information on flow rates, pressures, and temperatures measured by each measuring instrument.

As described above, the collected pieces of information are transmitted to the controller part, and whether the collected values satisfy Equations 1 to 18 above is determined. When the collected information satisfies any one of Equations 1 to 18, an alarm is generated.

In a specific example, when the information transmitted to the controller part does not satisfy any of Equations 1 to 18 above, after about 10 seconds or appropriate time determined by the user, the analyzer part and the measurer part of the system re-collect information. In this way, the system may continuously monitor performance of the separation membrane module and efficiently control the operation state of the system.

In another specific example, when the collected information satisfies any one of the alarm generation reference equations among the Equations 1 to 3, Equations 7 and 8, and Equations 11 to 14, an alarm related to an abnormality in the operation state of the system is generated. After the alarm is generated, the analyzer part and the measurer part of the system re-collect information after about 10 seconds or appropriate time determined by the user. In this way, the system may continuously monitor the operation state of the system.

In still another specific example, when, after an alarm based on any alarm generation equation is generated, the collected information satisfies any one of the operation generation reference equations among the Equations 4 to 6, Equations 9 and 10, and Equations 15 to 18, an operation generation alarm may be additionally generated, and the above-described countermeasure suitable for each equation may be generated to solve an abnormality in the system operation. Through such operation control, safety of an experimenter may be improved by preventing deterioration of the separation membrane due to impurities, and performance of the $CO_2$ separation membrane module may be safely evaluated without causing an accident due to any risk factor. After the abnormality in the system operation is solved by the countermeasure, the analyzer part and the measurer part of the system may re-collect information after about 10 seconds or appropriate time determined by the user. In this way, the system may continuously monitor the presence of abnormality in the system operation.

Another embodiment of the present invention relates to a device for the above-described $CO_2$ separation membrane module performance evaluation system. Such a $CO_2$ separation membrane module performance evaluation device may include a simulated gas supply line configured to simulate a gas composition of boiler exhaust gas and supply the simulated gas to a module unit part; the module unit part including a $CO_2$ separation membrane module and configured to cause the simulated gas to permeate through the $CO_2$ separation membrane module and separately discharge permeated gas, which has permeated through the separation membrane, to a permeation line and separately discharge passed gas, which has failed to permeate through the separation membrane, to a passage line; a discharge line which includes a line mixer configured to combine the gases discharged from the permeation line, and the passage line and which is configured to discharge the combined gas to the outside of the system; an analyzer part configured to collect each of the gas supplied from the supply line to the module unit part, the permeated gas discharged from the module unit part, and the passed gas discharged from the module unit part, analyze components thereof, and evaluate performance of the module; a refiner part installed in each of the permeation line, the passage line, and the discharge line and configured to remove pollutants from the gases passing through the lines; a measurer part configured to measure a flow rate, a temperature, and a pressure using a flow indicator, a temperature indicator, and a pressure indicator installed in each of the gas supply line, the permeation line, the passage line, and the discharge line; and a controller part configured to determine a state of the overall system on the basis of pieces of information collected from the analyzer part and the measurer part and generate an operation corresponding to a determined result.

The $CO_2$ separation membrane module performance evaluation device includes the simulated gas supply line configured to produce simulated gas according to functions and supply the produced simulated gas to the module unit part, the module unit part including the $CO_2$ separation membrane module and including the permeation line and the discharge line configured to separately discharge gas that has permeated through the $CO_2$ separation membrane module and gas that has passed through the module unit part without permeating through the $CO_2$ separation membrane module, and the discharge line configured to combine the gases that have passed through the module unit part and discharge the combined gas to the outside of the system.

Specifically, the simulated gas supply line may include a gas supply device configured to supply one or more gases among $CO_2$, nitrogen, oxygen, sulfur oxides ($SO_x$) and nitrogen oxides ($NO_x$), a line mixer configured to mix two or more of the gases and supply the mixed gas, one or more impurities supply device among a moisture supply unit and a dust supply unit configured to supply atmospheric impurities to the gas discharged from the gas supply device, a line heater configured to adjust a temperature of the simulated gas, and a supply valve installed at a front end of the module unit part to control opening and closing of the supply line.

Specifically, the module unit part may include a permeation valve and a passage valve respectively installed at the permeation line and the passage line and configured to control opening and closing of the permeation line and the passage line, and a permeation flow rate adjuster and a passage flow rate adjuster configured to control flow rates in the permeation line and the passage line.

Specifically, the refiner part may include a pollutant removing device including one or more of a dust filter configured to remove dust from the gases passing through the lines, a cooler and/or an absorption column configured to remove moisture, and a removal column configured to remove $SO_x$ and/or $NO_x$.

FIG. 2 illustrates a $CO_2$ separation membrane module performance evaluation device according to the present invention. Referring to FIG. 2, the simulated gas supply line may include a gas supply device configured to supply one or more gases of $CO_2$, $N_2$, $O_2$, $SO_x$, and $NO_x$. The gas supply device may include a pressure adjuster 101 and a flow rate adjuster 102 and control concentrations of the $CO_2$, $N_2$, $O_2$, $SO_x$, and $NO_x$. Two or more gases among the $CO_2$, $N_2$, $O_2$, $SO_x$, and $NO_x$ supplied from the gas supply device may be mixed by a line mixer 103 according to a concentration of simulated exhaust gas set by the user. Atmospheric impurities may be supplied to the gas discharged from the gas supply device via the one or more impurities supply device among a moisture supply unit 104 and a dust supply unit 105. In this case, for example, in the simulated gas supply line, an analyzer part facility such as a sample port S may be installed at a front end of the impurities supply device, a rear end of the impurities supply device, or between a plurality of impurities supply device to collect samples. In this way, components and compositions (concentrations) of samples passing through each facility disposed in the lines may be analyzed to control the composition of the simulated gas, and the performance of the $CO_2$ separation membrane module may be evaluated. In addition, a measurer part facility such as a flow indicator, a temperature indicator, and a pressure indicator may be installed in the supply line to measure a flow rate, a temperature, and a pressure. In this case, one or more, e.g., two or more, of each of a flow indicator 401, a temperature indicator TI, and a pressure indicator PI may be installed at a front end and a rear end of each facility installed in the supply line. The temperature of the simulated gas to which the impurities are supplied may rise to a temperature same as the actual exhaust gas temperature while the simulated gas passes through a line heater 106. The simulated gas supply line may include a supply valve disposed at a rear end of the supply line connected to the module unit part and a front end of the module unit part to control opening and closing of the supply line. In this way, a flow rate of gas transferred to the module unit part may be controlled.

The module unit part includes a $CO_2$ separation membrane module 201 which is subject to performance evaluation. The separation membrane module causes the simulated gas received from the supply line to permeate through the separation membrane and then separately discharges permeated gas to the permeation line and passed gas which has failed to permeate through the separation membrane to the passage line. In the separation membrane module 201 of FIG. 2, simulated gas is injected from the left side of the module, passed gas is discharged to the passage line at the right side of the module, and permeated gas is discharged to the permeation line at an upper portion of the module. In the permeation line and the passage line, a permeation valve and a passage valve configured to control opening and closing of the permeation line and the passage line and a permeation flow rate adjuster and a passage flow rate controller part and the like may be installed to adjust the flow rate and system operation. A sample collector may be installed in each of the permeation line and the passage line to analyze components and compositions (concentrations) of samples passing through the lines, and, in this way, performance of the $CO_2$ separation membrane module may be evaluated. Also, a flow indicator, a temperature indicator, and a pressure indicator are installed in each of the permeation line and the passage line to measure flow rates, temperatures, and pressures. In this case, one or more, e.g., two or more, of each of the flow indicator 401, the temperature indicator TI, and the pressure indicator PI may be installed at a front end and a rear end of each facility installed in the permeation line or the passage line. Also, the flow indicator 401, a vacuum pump 501, a back pressure adjuster 502, and the like may be further installed in the permeation line and the passage line so that a system control function is improved.

The discharge line may combine the gases discharged from the permeation line and the passage line through the line mixer and discharge the combined gas to the outside of the system. The sample port S may be installed in the discharge line to analyze components and compositions (concentrations) of samples passing through the lines, and, in this way, performance of the $CO_2$ separation membrane module may be evaluated. Also, a measurer part facility such as a flow indicator, a temperature indicator, and a pressure indicator may be installed in the discharge line to measure flow rates, temperatures, and pressures. In this case, one or more, e.g., two or more, of each of the flow indicator 401, the temperature indicator TI, and the pressure indicator PI may be installed at a front end and a rear end of each facility installed in the discharge line.

The refiner part is installed in each of the permeation line, the passage line, and the discharge line to remove pollutants from gases passing through the lines. The refiner part may include a pollutant removing device including one or more of a dust filter configured to remove dust from the gas passing through each of the permeation line, the passage line, and the discharge line, a cooler configured to remove moisture, and a removal column configured to remove $SO_x$ and $NO_x$.

In addition, the $CO_2$ separation membrane module performance evaluation system device of the present invention may further include an output unit (e.g., a display device) capable of displaying an operation state based on whether any equation is satisfied. For example, letters, symbols, diagrams or the like indicating a situation in which an alarm is generated, a situation in which an operation alarm is generated, an operation generated by the controller part, and the like may be displayed on the output unit, but embodiments are not limited thereto.

For example, the above-described $CO_2$ separation membrane module performance evaluation system of the present invention may be performed by the above-described $CO_2$ separation membrane module performance evaluation device of the present invention. In such a case, the system and device confirm pieces of information collected by the above-described measurer part and analyzer part according to Equations 1 to 18 and generate corresponding alarms. Accordingly, the system and device may generate countermeasures to control the system.

For example, when the above-described $CO_2$ separation membrane module performance evaluation system of the present invention is performed by the exemplary device of FIG. 2, an alarm may be generated or an operation may be generated according to a corresponding reference equation as shown in Table 1 below.

TABLE 1

| Reference equation | Content of equation | Control logic: alarm | Control logic: operation | Content displayed on output unit |
|---|---|---|---|---|
| Equation 1 | PRI-PPI ≤ SET_DPPR | Alarm indicating that pressure state is abnormal | — | DP Low |

TABLE 1-continued

| Reference equation | Content of equation | Control logic: alarm | Control logic: operation | Content displayed on output unit |
|---|---|---|---|---|
| Equation 2 | PF ≥ 0.9 × SET_PM | Alarm indicating that pressure of injected gas is high | — | P High |
| Equation 3 | PF-PRI ≥ 0.9 × SET_DPM | Alarm indicating that pressure difference of modules is high | — | Module DP High |
| Equation 4 | PRI-PPI < 0 | Operation alarm indicating that pressure state is abnormal | Forcibly discharge gas from permeation line | DP Low Low Forcibly discharge gas from permeation line |
| Equation 5 | PF ≥ SET_PM | Operation alarm indicating that pressure of injected gas is high | Block flow rate adjuster, block dust generator, block line heater, forcibly discharge gas from passage line | P High High Block flow rate adjuster Block dust generator Block line heater Forcibly discharge gas from passage line |
| Equation 6 | PF-PRI ≥ SET_DPM | Operation alarm indicating that pressure difference between modules is high | Block flow rate adjuster, block dust generator, block line heater | Module DP High High Block flow rate adjuster Block dust generator Block line heater |
| Equation 7 | TP ≥ 0.9 × SET_MFM | Alarm indicating that temperature of gas entering flow indicator is high | — | MFM T High |
| Equation 8 | TR ≥ 0.9 × SET_MFM | Alarm indicating that temperature of gas entering flow indicator is high | — | MFM T High |
| Equation 9 | TP ≥ SET_MFM | Operation alarm indicating that temperature of gas entering flow indicator is high | Operate cooler, block line heater | MFM T High High Operate cooler Block line heater |
| Equation 10 | TR ≥ SET_MFM | Operation alarm indicating that temperature of gas entering flow indicator is high | Operate cooler, block line heater | MFM T High High Operate cooler Block line heater |
| Equation 11 | C_SOX ≥ 0.9 × SET_CSOX | Alarm indicating that excessive amount of $SO_x$ is discharged | — | SOx High |
| Equation 12 | C_NOX ≥ 0.9 × SET_CNOX | Alarm indicating that excessive amount of $NO_x$ is discharged | — | NOx High |

TABLE 1-continued

| Reference equation | Content of equation | Control logic: alarm | Control logic: operation | Content displayed on output unit |
|---|---|---|---|---|
| Equation 13 | PPI-PPO ≥ 0.9 × SET_DPF | Alarm indicating that pressure difference of refiner parts is high | — | Filter DP High |
| Equation 14 | PRI-PRO ≥ 0.9 × SET_DPF | Alarm indicating that pressure difference of refiner parts is high | — | Filter DP High |
| Equation 15 | C_SOX ≥ SET_CSOX | Operation alarm indicating that excessive amount of $SO_x$ is discharged | Block SOx flow rate adjuster | SOx High High Block SOx |
| Equation 16 | C_NOX ≥ SET_CNOX | Operation alarm indicating that excessive amount of $NO_x$ is discharged | Block NOx flow rate adjuster | NOx High High Block NOx |
| Equation 17 | PPI-PPO ≥ SET_DPF | Operation alarm indicating that pressure difference of refiner parts is high | Block flow rate adjuster, block dust generator, block line heater | Filter DP High High Block flow rate adjuster Block dust generator Block line heater |
| Equation 18 | PRI-PRO ≥ SET_DPF | Operation alarm indicating that pressure difference of refiner parts is high | Block flow rate adjuster, block dust generator, block line heater | Filter DP High High Block flow rate adjuster Block dust generator Block line heater |

For example, when the collected information satisfies Equation 1, an alarm indicating that a pressure state is abnormal (DP Low Alarm) may be generated when a difference between a pressure of the passage line (PM) at a front end of the refiner part (dust filter) and a pressure of the permeation line at a front end of the refiner part (dust filter) is a set value (SET_DPPR) or lower. Also, when the collected information satisfies Equation 4, an operation forcibly discharging gas from a pipe of the permeation line may be performed simultaneously with the generation of an operation alarm indicating that a pressure state is abnormal (DP Low Low Alarm). In this way, the situation in which Equation 1 or 4 is satisfied may be a situation that does not occur in a normal operation but occurs when gas in a pipe of the passage line is emitted to the atmosphere after a certain amount of time in the case in which the pressure in the separation module is present and the vacuum pump has not operated. In this case, the separation membrane module may reach a pressure state opposite to a typical operation condition, and the separation membrane may be damaged. However, the system of the present invention controls alarms and countermeasures related thereto so that such damages are prevented.

For example, when the collected information satisfies Equation 2, an alarm indicating that a pressure of injected gas is high (P High) may be generated when a a pressure of the supply line in a front end of the module unit part (PF) exceeds 90% of an allowable pressure value (SET_PM) of gas injected into the module unit part through the supply line. Also, when the collected information satisfies Equation 5, by simultaneously generating an operation alarm indicating that the pressure state is abnormal (P High High) and generating an operation blocking the flow rate adjuster, the dust generator, and the line heater and forcibly discharging a fluid from the passage line, damages to the separation membrane due to an excessively high pressure being acted on the separation membrane module may be prevented.

For example, when the collected information satisfies Equation 3, an alarm indicating that a pressure difference between the modules is high (Module DP High) may be generated when a pressure difference between a pressure of the supply line in a front end of the module unit part (PF) and a pressure of the permeation line in a front end of the refiner part (PPI) exceeds 90% of an allowable pressure difference value (SET_DPM) between the supply line and the passage line. Also, when the collected information satisfies Equation 6, by simultaneously generating an operation alarm indicating that a pressure difference between the modules is high (Module DP High High) and an operation blocking the flow rate adjuster, the dust generator, and the line heater, dust accumulation in the module and other abnormal situations may be dealt with.

For example, when temperature information, whose value is input from a temperature indicator installed at the flow indicator 401 and at the front end of the flow indicator 401 installed in the passage line or permeation line, satisfies one or more of Equations 7 and 8, an alarm indicating that the temperature is high (MFM T High) may be generated when the temperature is 90% or more of an allowable system temperature (SET_MFM). When the temperature information satisfies one or more of Equations 9 and 10, an operation alarm indicating that a temperature of gas entering the flow indicator is high (MFM T High High) may be generated, a cooler may be operated, and the line heater may be blocked to prevent deterioration of the membrane due to an excessive temperature rise, protect a panel of the flow indicator, and prevent fire.

For example, when a $SO_x$ concentration and a $NO_x$ concentration (C_SOX and C_NOX) of a sample analyzed in a sample port of the discharge line satisfy one or more of Equations 11 and 12, an alarm indicating that an excessive amount of $SO_x$ or $NO_x$ is discharged may be generated when the amount of discharged $SO_x$ or $NO_x$ is 90% of an allowable $SO_x$ discharge value (SET_CSOX) or 90% of an allowable $NO_x$ discharge value (SET_CNOX). Also, when the collected information satisfies one or more of Equations 15 and 16, by generating an operation alarm indicating that an excessive amount of $SO_x$ or $NO_x$ is discharged ($SO_x/NO_x$ High High) and performing an operation blocking the $SO_x$ flow rate indicator and the $NO_x$ flow rate indicator, it is possible to prevent a situation in which a $SO_x/NO_x$ removal column 303 does not perform well and thus pollutants are emitted to the atmosphere.

For example, when the collected a pressure of the permeation line in a front end of the refiner part (PPI), a pressure of the permeation line in a rear end of the refiner part (PPO), a pressure of the passage line in a front end of the refiner part (PRI), and a pressure of the passage line in a rear end of the refiner part (PRO) satisfy any one of Equations 13 and 14, an alarm indicating that a pressure difference of the refiner parts is high may be generated. In this case, the refiner part may be a dust filter. In such a case, the effect of preventing damages to the filter and removing impurities that is brought about by controlling a pressure at a front end of a dust filter, which is the refiner part, may be further improved. Also, when the collected a pressure of the permeation line in a front end of the refiner part (PPI), a pressure of the permeation line in a rear end of the refiner part (PPO), a pressure of the passage line in a front end of the refiner part (PM), and a pressure of the passage line in a rear end of the refiner part (PRO) satisfy any one of the Equations 17 and 18, an alarm (Filter DP High High) may be generated and an operation blocking the flow rate adjuster, the dust generator, and the line heater may be performed to prevent a situation in which a pressure of injected gas is increased due to an increase in the pressure difference.

DESCRIPTION OF REFERENCE NUMERALS

101: pressure adjuster
102: flow rate adjuster
103: line mixer
104: moisture supply unit
105: dust generation unit
106: line heater
201: separation membrane module
301: dust filter
302: cooler
303: $SO_x/NO_x$ removal column
401: flow indicator
501: vacuum pump
502: back pressure adjuster
TI: temperature indicator
PI: pressure indicator
S: sample port

The invention claimed is:

1. A system for evaluating performance of a carbon dioxide ($CO_2$) separation membrane module, the system comprising:
   a simulated gas supply line configured to simulate a gas composition of boiler exhaust gas and supply the simulated gas to a module unit part;
   the module unit part including a $CO_2$ separation membrane module and configured to cause the simulated gas to permeate through the $CO_2$ separation membrane module and separately discharge permeated gas, which has permeated through the separation membrane, to a permeation line, and separately discharge passed gas, which has failed to permeate through the separation membrane, to a passage line;
   a discharge line configured to combine the gases discharged from the permeation line and the passage line and discharge the combined gas to the outside of the system;
   an analyzer part configured to collect each of the gas supplied from the supply line to the module unit part, the permeated gas discharged from the module unit part, and the passed gas discharged from the module unit part, analyze components thereof, and evaluate performance of the module;
   a refiner part installed in each of the permeation line, the passage line, and the discharge line and configured to remove pollutants from the gases passing through each of the lines;
   a measurer part configured to measure a flow rate, a temperature, and a pressure using a measuring instrument installed in each of the gas supply line, the permeation line, the passage line, and the discharge line; and
   a controller part configured to determine a state of the overall system on the basis of pieces of information collected from the analyzer part and the measurer part and generate an operation corresponding to a determined result.

2. The system of claim 1, wherein the simulated gas supply line includes:
   a gas supplier part configured to supply one or more gases among $CO_2$, nitrogen, oxygen, sulfur oxides ($SO_x$) and nitrogen oxides ($NO_x$) to the simulated gas supply line; and
   an impurities supplier part configured to supply one or more atmospheric impurities among moisture and dust to the simulated gas supply line.

3. The system of claim 1, wherein, when collected information satisfies one or more of Equations 11 to 14 below, the controller part performs an operation generating an alarm indicating that the refiner part is abnormal:

$$C\_SOX \geq 0.9 \times SET\_CSOX \qquad \text{[Equation 11]}$$

$$C\_NOX \geq 0.9 \times SET\_CNOX \qquad \text{[Equation 12]}$$

$$PPI-PPO \geq 0.9 \times SET\_DPF \qquad \text{[Equation 13]}$$

$$PRI-PRO \geq 0.9 \times SET\_DPF, \qquad \text{[Equation 14]}$$

In Equation 11 to 14 wherein
PPI represents a pressure of the permeation line in a front end of the refiner part;

PPO represents a pressure of the permeation line in a rear end of the refiner part;
PRI represents a pressure of the passage line in a front end of the refiner part;
PRO represents a pressure of the passage line in a rear end of the refiner part;
C_SOX represents a $SO_x$ concentration measured in the discharge line;
C_NOX represents a $NO_x$ concentration measured in the discharge line;
SET_CSOX represents an allowable $SO_x$ discharge value;
SET_CNOX represents an allowable $NO_x$ discharge value; and
SET_DPF represents an allowable pressure difference value of the refiner parts.

4. The system of claim 3, wherein, when collected information satisfies one or more of Equations 15 to 18 below, the controller part performs an operation changing system operation conditions:

$$C\_SOX \geq SET\_CSOX \quad \text{[Equation 15]}$$

$$C\_NOX \geq SET\_CNOX \quad \text{[Equation 16]}$$

$$PPI-PPO \geq SET\_DPF \quad \text{[Equation 17]}$$

$$PRI-PRO \geq SET\_DPF, \quad \text{[Equation 18]}$$

In Equation 15 to 18 wherein
PPI represents a pressure of the permeation line in a front end of the refiner part;
PPO represents a pressure of the permeation line in a rear end of the refiner part;
PRI represents a pressure of the passage line in a front end of the refiner part;
PRO represents a pressure of the passage line in a rear end of the refiner part;
C_SOX represents a $SO_x$ concentration measured in the discharge line;
C_NOX represents a $NO_x$ concentration measured in the discharge line;
SET_CSOX represents an allowable $SO_x$ discharge value;
SET_CNOX represents an allowable $NO_x$ discharge value; and
SET_DPF represents an allowable pressure difference value of the dust filters.

5. The system of claim 1, wherein the refiner part removes pollutants from the gases discharged from the $CO_2$ separation module by using one or more of a dust filter, a moisture cooler, a moisture absorption column, a $SO_x$ removal column, and a $NO_x$ removal column disposed in each of the permeation line, the passage line, and the discharge line.

6. The system of claim 5, wherein, when collected information satisfies one or more of Equations 1 to 3 below, the controller part performs an operation generating an alarm indicating that a pressure is abnormal:

$$PRI-PPI \leq -SET\_DPPR \quad \text{[Equation 1]}$$

$$PF \geq 0.9 \times SET\_PM \quad \text{[Equation 2]}$$

$$PF-PRI \geq 0.9 \times SET\_DPM, \quad \text{[Equation 3]}$$

In Equation 1 to 3, wherein
PF represents a pressure of the supply line in a front end of the module unit part;
PPI represents a pressure of the permeation line in a front end of the refiner part;
PRI represents a pressure of the passage line in a front end of the refiner part;
SET_DPPR represents an allowable pressure difference value between the passage line and the permeation line;
SET_PM represents an allowable pressure value of the supply line; and
SET_DPM represents an allowable pressure difference value between the supply line and the passage line.

7. The system of claim 6, wherein, when collected information satisfies one or more of Equations 4 to 6 below, the controller part performs an operation changing system operation conditions:

$$PRI-PPI<0 \quad \text{[Equation 4]}$$

$$PF \geq SET\_PM \quad \text{[Equation 5]}$$

$$PF-PRI \geq SET\_DPM, \quad \text{[Equation 6]}$$

In Equation 4 to 6, wherein
PF represents a pressure of the supply line in a front end of the module unit part;
PPI represents a pressure of the permeation line in a front end of the refiner part;
PRI represents a pressure of the passage line in a front end of the refiner part;
SET_PM represents an allowable pressure value of the supply line; and
SET_DPM represents an allowable pressure difference value between the supply line and the passage line.

8. The system of claim 5, wherein, when collected information satisfies one or more of Equations 7 and 8 below, the controller part performs an operation generating an alarm indicating that a temperature is abnormal:

$$TP \geq 0.9 \times SET\_MFM \quad \text{[Equation 7]}$$

$$TR \geq 0.9 \times SET\_MFM, \quad \text{[Equation 8]}$$

In Equation 7 to 8, wherein
TP represents a temperature measured in the permeation line;
TR represents a temperature measured in the passage line; and
SET_MFM represents an allowable system temperature.

9. The system of claim 8, wherein, when collected information satisfies one or more of Equations 9 and 10 below, the controller part performs an operation changing system operation conditions:

$$TP \geq SET\_MFM \quad \text{[Equation 9]}$$

$$TR \geq SET\_MFM, \quad \text{[Equation 10]}$$

In Equation 9 to 10, wherein
TP represents a temperature measured in the permeation line;
TR represents a temperature measured in the passage line; and
SET_MFM represents an allowable system temperature.

10. A device for evaluating performance of a carbon dioxide ($CO_2$) separation membrane module, the device comprising:
a simulated gas supply line configured to simulate a gas composition of boiler exhaust gas and supply the simulated gas to a module unit part;
the module unit part including a $CO_2$ separation membrane module and configured to cause the simulated gas to permeate through the $CO_2$ separation membrane module and separately discharge permeated gas, which has permeated through the separation membrane, to a permeation line, and separately discharge passed gas, which has failed to permeate through the separation membrane, to a passage line;

a discharge line which includes a line mixer configured to combine the gases discharged from the permeation line and the passage line and which is configured to discharge the combined gas to the outside of the system;

an analyzer part configured to collect each of the gas supplied from the supply line to the module unit part, the permeated gas discharged from the module unit part, and the passed gas discharged from the module unit part, analyze components thereof, and evaluate performance of the module;

a refiner part installed in each of the permeation line, the passage line, and the discharge line and configured to remove pollutants from the gases passing through each of the lines;

a measurer part configured to measure a flow rate, a temperature, and a pressure using a flow indicator, a temperature indicator, and a pressure indicator installed in each of the supply line, the permeation line, the passage line, and the discharge line; and a controller part configured to determine a state of the overall system on the basis of pieces of information collected from the analyzer part and the measurer part and generate an operation corresponding to a determined result.

11. The device of claim 10, wherein the simulated gas supply line includes:

a gas supply device configured to supply one or more gases among $CO_2$, nitrogen, oxygen, sulfur oxides ($SO_x$) and nitrogen oxides ($NO_x$);

a line mixer configured to mix two or more of the gases and supply the mixed gas;

one or more impurities supply device among a moisture supply unit and a dust supply unit configured to supply atmospheric impurities to the gas discharged from the gas supply device;

a line heater configured to adjust a temperature of the simulated gas; and a supply valve installed at a front end of the module unit part to control opening and closing of the supply line.

12. The device of claim 10, wherein the module unit part includes a permeation valve and a passage valve respectively installed at the permeation line and the passage line and configured to control opening and closing of the permeation line and the passage line; and a permeation flow rate adjuster and a passage flow rate adjuster configured to control flow rates in the permeation line and the passage line.

13. The device of claim 10, wherein the refiner part includes a pollutant removing device including one or more of a dust filter configured to remove dust from the gases passing through the lines, a moisture cooler, a moisture absorption column, a $SO_x$ removal column, and a $NO_x$ removal column.

* * * * *